Nov. 26, 1957 E. J. MORLACCHI 2,814,113
BUTTER AND CHEESE HOLDER AND SLICER
Filed Sept. 10, 1956 2 Sheets-Sheet 1
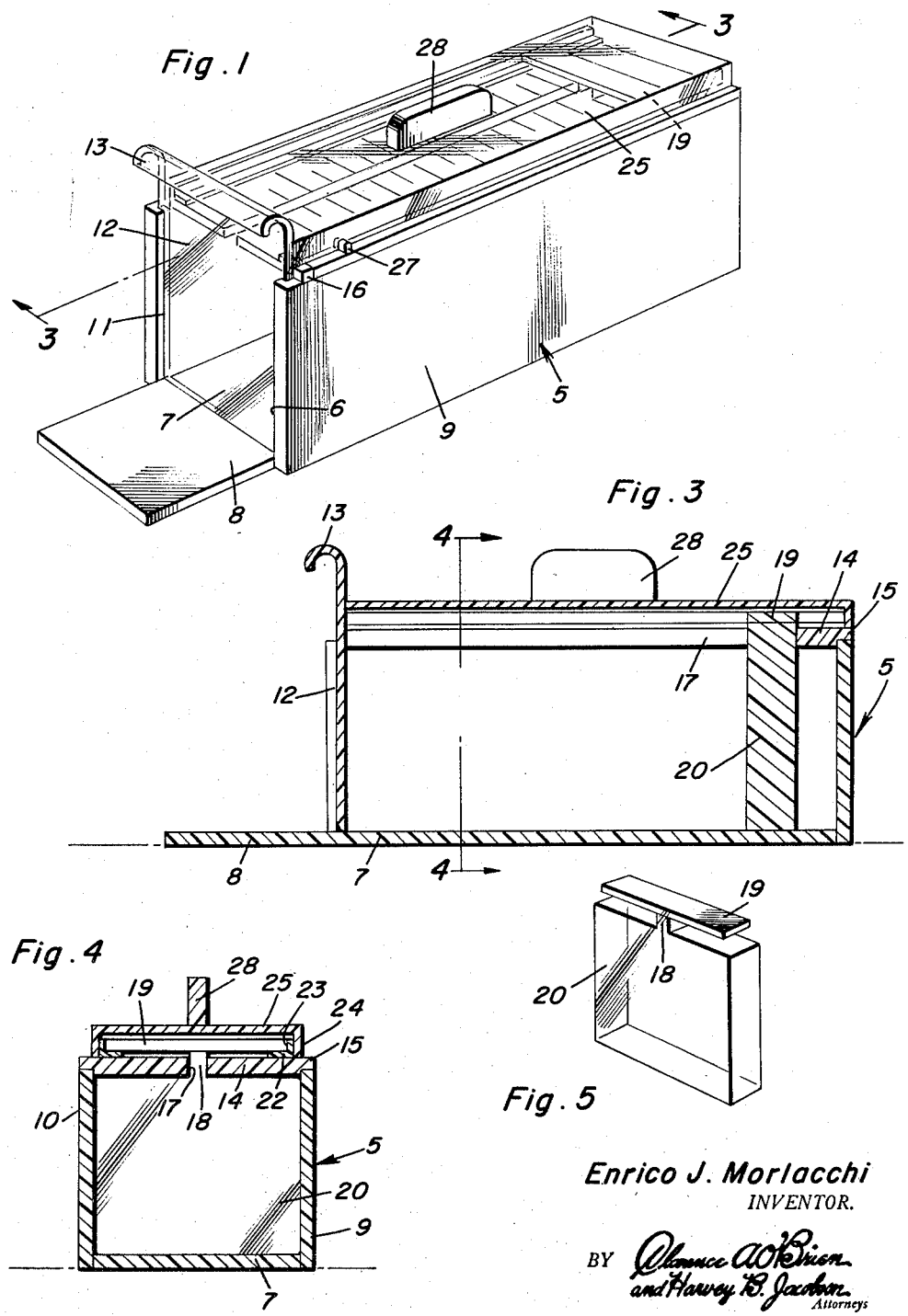
Enrico J. Morlacchi
INVENTOR.

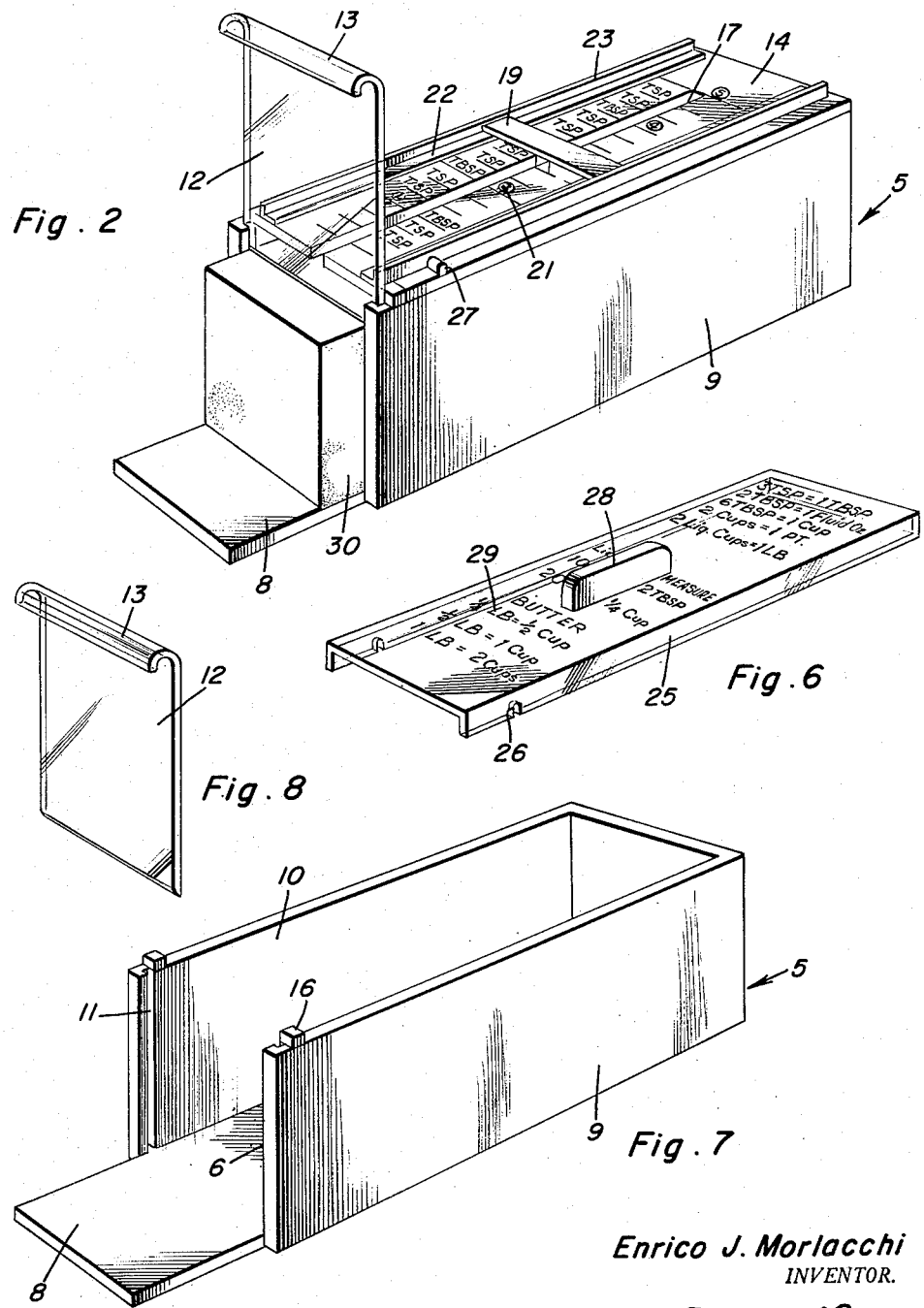

2,814,113
BUTTER AND CHEESE HOLDER AND SLICER
Enrico J. Morlacchi, Oxnard, Calif.
Application September 10, 1956, Serial No. 608,910
1 Claim. (Cl. 31—17)

The present invention relates to new and useful improvements in kitchen and table articles and more particularly to a container for holding a block of butter or cheese or similar food product and embodying means for feeding the block therethrough to a cutter for slicing predetermined quantities from the block.

An important object of the invention is to provide a follower in the container for the block of food product to feed the latter forwardly toward a cutter and to construct the follower with gauge means coacting with a scale on top of the container to indicate the thickness of a slice to be cut from the block of food.

Another object of the invention is to provide a removable top for the container to facilitate placing a block of food therein and constructing the top with a guide slot for the combined follower and gauge.

A further object is to provide a cover for the top of the container to effectively seal the same when not in use.

A still further object is to provide a device of this character of simple and practical construction, which is efficient and reliable in operation, neat and attractive in appearance, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;
Figure 2 is a perspective view with the cover removed and the cutter raised for slicing the block of food in the container;
Figure 3 is a longitudinal sectional view taken on a line 3—3 of Figure 1;
Figure 4 is a transverse sectional view taken on a line 4—4 of Figure 3;
Figure 5 is a perspective view of the combined follower and gauge;
Figure 6 is a perspective view of the cover;
Figure 7 is a perspective view of the container with the top and cover removed; and
Figure 8 is a perspective view of the cutter.

Referring now to the drawings in detail wherein for the purpose of illustration I have disclosed a preferred embodiment of invention, the numeral 5 designates a container of rectangular shape, which may be constructed of plastic or other suitable inexpensive material and of a size suitable for holding a cake or block of butter, cheese or other food product and which are customarily sold in stores of a uniform cross-sectional area and of a length to provide a pound or more in weight. The front of the container is open as shown at 6 and the bottom 7 thereof projects forwardly of the open front of the container to form a shelf 8.

The side walls 9 and 10 of the container are provided at their inner surfaces adjacent the open front 6 with vertical guide grooves 11 for receiving a vertically slidable cutter 12. The upper end of the cutter is formed with a rolled hand-grip 13.

The top of the container is closed by a removable top member 14 having its underside at its marginal edges rabbeted to form a shoulder 15 for resting on top of the container and with the top member 14 fitting closely inside the walls of the container to prevent rearward and lateral sliding movement of the latter. Stop lugs 16 are formed on the upper edges of the side walls 9 and 10 adjacent the top of the container and which engage the front end of the top member 14 to prevent forward sliding movement thereof.

The top member 14 is formed with a longitudinal guide slot 17 to slidably receive the shank portion 18 of a T-shaped gauge 19 which is formed at the upper edge of a follower block 20 positioned in the container under the top member 14. The gauge 19 extends transversely on top of the top member 14 and coacts with a graduated scale 21 provided on top of the top member 14 to provide a measurement for cutting the block of food into slices of predetermined size or thickness.

The gauge 19 is slidable at its end portions on a pair of parallel guide tracks 22 which are suitably secured on top of the top member 14 adjacent the side edges of the latter and the guide tracks are of angle construction in cross-section to form parallel upstanding flanges 23.

The guide tracks 22 serve the double function of aiding in maintaining the gauge 19 at right angles to the longitudinal axis of the container and also for engaging the straight portion 24 of a cover plate 25 over the top of the container for sealing the same. The straight portion 24 at the sides of the cover 25 are also formed with notches 26 to receive lugs 27 on top of the top member 14 to prevent forward or rearward sliding movement of the cover thereon. A handle or finger-grip 28 is formed on top of the cover 25 to facilitate removal and handling thereof.

The top of the cover may be provided with measurement scale 29 appropriate to the type of food to be sliced in the container.

In the operation of the device, a cake or block of butter, cheese or the like 30 is placed in the container, and the top member 14 is then placed in position with the follower 20 behind the cake or block 30. The gauge 19 is then moved forwardly and which also slides the follower and cake or block forwardly to project the latter a predetermined distance at the front of the container, according to the size or thickness of a slice to be cut as designated by the scale 21. The cutter 12 is then forced downwardly in the guide grooves 11 to slice the food.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A food slicer comprising a rectangular shaped container having a top member, an open front end, a bottom, and a longitudinal central slot in the top member, a follower slidably fitted in the container for moving a cake of food in the container forwardly out of said front end, gauge means on top of the follower extending upwardly through said slot and across and over said top member, a pair of tracks on said top member extending along opposite sides of the container and on which said gauge means is slidably guided during forward movement of said follower, a vertically slidable cutter on the front end of the container for slicing the food moved out of said front end, an extension on said bottom of the container projecting forwardly under said cutter and forming a shelf against which the cutter cuts and supporting the sliced food, and a scale on said top member for indicating the degree of forward movement of the follower.

References Cited in the file of this patent
UNITED STATES PATENTS
2,650,428    Epperson _____ Sept. 1, 1953